Patented July 1, 1947

2,423,389

UNITED STATES PATENT OFFICE 2,423,389

PROCESS FOR PURIFYING AN ARYL OLEFINE HAVING THE STYRENE STRUCTURE AS A NUCLEUS

Claude W. Jordan, Paoli, Pa., assignor to The United Gas Improvement Company, a corporation of Pennsylvania No Drawing. Application October 24, 1944, Serial No. 560,195. In Canada September 23, 1944

12 Claims. (Cl. 260—669)

This application is a continuation-in-part of my copending application Serial No. 398,403, filed June 17, 1941, and of my copending application Serial No. 430,886, filed February 14, 1942, which has matured into Patent 2,363,676, granted November 28, 1944.

This invention pertains generally to the purification of aryl olefines and pertains particularly to the purification of aryl olefines obtained from light oil.

More specifically, this invention pertains to the purification of polymerizable aryl olefines by the application of amides of metals in group IA and group IIA of the periodic table.

It is an object of the present invention to purify aryl olefines by the use of one or more amides of alkali or alkaline earth metals under carefully controlled conditions. Another object of the invention is the provision of certain methods whereby aryl olefines may be purified by the application of one or more amides of alkali or alkaline earth metals without undue loss of aryl olefine in the form of aryl olefine polymers of low quality.

Other objects of the invention will be apparent to those skilled in the art from an inspection of the following description and claims.

This invention is particularly adapted for the purification of aryl olefines containing the styrene structure as a nucleus, such as styrene; alkylstyrenes, particularly alkylstyrene in which the alkyl substituents each contain less than 5 carbon atoms such as the methylstyrenes, for example, the side chain substituted methylstyrenes such as alpha-methylstyrenes and beta-methylstyrene and the nuclearly substituted mono-methylstyrenes such as o-methylstyrene, m-methylstyrene, and p-methylstyrene; ethylstyrene; isopropylstyrene; normal-propylstyrene; ethylmethylstyrene; methylisopropylstyrene; di-methyl-tertiary-butylstyrene; and the like.

In the various processes for the manufacture of combustible gas such as oil gas, carburetted water gas, or coal gas, considerable quantities of tar are produced, and the gas contains substantial quantities of readily condensible materials.

These condensates, including the light oil obtained upon distillation of the tar, are sources for many hydrocarbons. In particular, they are sources of styrene and methylstyrene.

With ordinary methods of fractional distillation as now practiced, it is impossible to separate many of these unsaturated compounds in a substantially pure state because of the presence of other materials which apparently are either of similar boiling point or are capable of forming azeotropic mixtures with the desired hydrocarbon. This is especially true in the case of styrene and methylstyrene, in which the usual polymerizing difficulties are increased by the pronounced tendency of the material to polymerize during the fractionation process. For example, a typical methylstyrene fraction obtained by ordinary distillation processes will contain hardly more than 50% or 60% methylstyrene.

This has led to the development of auxiliary methods for increasing the concentration of light oil methylstyrene fractions and of light oil styrene fractions to the desired extent.

Methylstyrene fractions and styrene fractions obtained by the fractionation of light oil according to the usual methods employed in the art, as well as those of lower and higher concentration obtained, for example, by the use of more drastic fractionating methods and/or the use of certain special concentrating methods, are generally suited for the manufacture of synthetic resins by suitable polymerization methods, except that the resulting resins are very often too inferior with respect to color, color stability, electrical resistance, molding properties, freedom from crazing, thermal stability, melting point, specific viscosity, molecular weight, and mechanical strength as to be of any considerable value.

I find that these deficiencies are generally traceable to the presence of certain contaminating materials in the methylstyrene fractions, and in the styrene fractions during the polymerizing process.

While I have not as yet exactly determined the character of all of these impurities, experimental evidence indicates that they may be classified in certain specific groups.

For example, a typical styrene fraction obtained from light oil was found to contain approximately 0.1% sulfur and a typical methylstyrene fraction obtained from light oil was analyzed and found to contain appreciable quantities of sulfur. This indicates that crude styrene and crude methylstyrene obtained from the above sources contain a relatively large quantity of sulfur-containing materials, such as mercaptans, disulfides, and/or derivatives of thiophene and related compounds.

Another portion of each of these fractions was treated with a mercurating solution which resulted in the production of a copious precipitate. Precipitates obtained from different portions of the starting material varied in color from a faint yellow to a light brown. This indicates, among other things, the presence of substituted thiophene and thiophene homologues.

The treatment of various light oil fractions with ammoniacal cuprous chloride resulted in the formation of a heavy yellow precipitate. This indicates the presence of acetylenic compounds, such as phenylacetylene and methylphenylacetylene. Further work resulted in the isolation of substantial quantities of phenylacetylene from several light oil styrene fractions, indicating that this material is a principal impurity of light oil styrene, and also resulted in the isolation of substantial quantities of methylphenylacetylene from several light oil methylstyrene fractions, indicating that this material, as well as other substituted acetylenes, such as benzylacetylene is a principal impurity of light oil methylstyrene.

All of the above mentioned acetylenic compounds are acetylenic compounds having a hydrogen atom attached to a carbon atom of a triple bond.

Similar tests made with pure styrene diluted with xylene and with pure methylstyrene diluted with xylene to the same concentration as the crude styrene fractions and the crude methylstyrene fractions treated above gave results which were negative in each case.

Indene also is an important impurity of light oil methylstyrene fractions, and imparts particularly undesirable properties to the polymers derived therefrom.

Other types of impurities are doubtless present also in light oil styrene fractions and in light oil methylstyrene fractions. Among these types of impurities may be included oxygenated compounds such as organic peroxides; organic per acids; aldehydes, for example, formaldehyde, benzaldehyde and methyl benzaldehyde or mixtures of aldehydes, for example a mixture of formaldehyde and benzaldehyde; and other reactive classes of compounds.

An important class of compounds in light oil styrene fractions and in light oil methylstyrene fractions, from the standpoint of their influence upon the properties of the polystyrene and polymethylstyrene subsequently obtained from such fractions, are the colored compounds which impart a yellow or yellow-brown color to the said fractions. While I have not as yet determined the actual structure of any of these colored compounds, certain evidence indicates that they mainly comprise unsaturated compounds with conjugated systems of double bonds.

As indicated above, it is difficult, if not impossible, to prepare a commercial grade of polystyrene or polymethylstyrene from crude light oil fractions unless at least some of the contaminating impurities are removed.

While the exact influence of each of these contaminating materials is not known, it may be pointed out that they may act (1) as accelerators, resulting in the production of polystyrene or polymethylstyrene of relatively poor quality under polymerizing conditions which would normally result in the production of a good grade of polystyrene or polymethylstyrene; (2) as inhibitors, reducing the quantity of polystyrene or polymethylstyrene obtained under normal polymerizing conditions, and/or (3) they may take part in the reaction and become an integral part of the resin molecule.

The presence of contaminating impurities in the polymer molecule undoubtedly would weaken it, causing the resin to be less stable to heat and to decompose readily with the formation of undesired color bodies.

The highly reactive nature of the styrene and methylstyrene present in light oil fractions of the type disclosed makes it extremely difficult to remove the contaminating impurities.

I have found, however, that by a proper choice of conditions such as temperature, time of contact, method of application, and so forth, the undesired contaminating materials mentioned, including color and color-forming compounds, may be removed without a considerable loss of the desired hydrocarbon. This is accomplished by the application of one or more amides of metals in groups IA and IIA of the periodic table, preferably in finely divided form, which term as used herein is intended to include solutions or dispersions in suitable solvents or vehicles.

Amides of metals in group IA and IIA of the periodic table, namely, lithium, sodium, potassium, rubidium, caesium, magnesium, barium, strontium, and calcium, or mixtures containing one or more of these materials may be used for refining impure aryl olefine fractions, particularly those obtained from light oil. Due to the availability and low cost of sodium and potassium, however, amides of these metals are preferred for the use set forth herein.

Examples of amides which may be used to refine aryl olefines in accordance with my invention are sodium amide, potassium amide, lithium amide, magnesium amide, barium amide and the like.

Due consideration must be given to the fact that many of these amides may be active catalysts for the polymerization of aryl olefines such as styrene and methylstyrene. Consequently, great care must be exercised in order to operate the process within well defined limits in order to effect the removal of the impurities present without polymerizing excessive quantities of the monomeric aryl olefine present in the crude fraction treated.

The most important of these reaction variables are (1) degree of subdivision of the treating agent, (2) concentration of the aryl olefine fraction treated, (3) quantity of amide used, (4) reaction temperature, (5) quantity and type of impurities present in the aryl olefine fraction, (6) method of applying the amide to the aryl olefine fraction, (7) speed of agitation and (8) reaction time.

In view of the extreme difficulty in exactly delimiting each variable in the wide variety of possible combinations of the foregoing eight variables, resort will be had to an expression for reaction conditions which will be well understood by persons skilled in the art upon becoming familiar with this invention. It may be said that treating conditions should be such, having in mind what has been said with respect to the above variables, as to avoid a substantially large polymerization of the aryl olefine under treatment. In other words, the aryl olefine such as styrene and methylstyrene is treated under reaction conditions insufficiently severe to polymerize a large part thereof during treatment.

Once knowing what the variables in treating conditions are and the effect of such variables, it is relatively simple for the person skilled in the art upon becoming familiar with this invention to control his reaction conditions to avoid unnecessary polymerization of the aryl olefine undergoing treatment.

Undoubtedly, the most important of these reaction variables is the degree of subdivision of the treating agent. As pointed out previously, particularly satisfactory results are obtained when the treating agent is very finely divided or is used in the form of a solution in a suitable solvent. While it is difficult to assign a definite size above which it may be said that the respective amides are inefficient, it has been found that when the degree of subdivision is such that the major portion of the amide is comprised of particles smaller than $\frac{1}{32}''$ in each diameter, excellent results are obtained.

Almost any desired method may be employed in the preparation of the metallic amides utilized in the practice of the invention. Particularly advantageous results have been obtained in the practice of my invention when utilizing sodium amide prepared by adding ammonia-soluble salts of iron, nickel or cobalt, for example ferric nitrate, to a solution of sodium in liquid ammonia at low temperature, for example a temperature of about −33° C., in the presence of a catalyst such as sodium oxide, sodium peroxide, and mixtures of sodium oxides.

Styrene fractions containing from 1% to 99.9% monomeric styrene may be treated by the method described herein to produce water-white refined fractions possessing only traces, or none of yellow color, or undesired impurities, such as phenylacetylene, benzaldehyde and the like.

Methylstyrene fractions containing from 1% to 99.9% monomeric methyl styrene may be treated by the method described herein to produce water-white refined fractions possessing only traces, or none, of undesired impurities, such as methylphenylacetylene, methylbenzaldehyde and the like. Fractions containing at least 30% styrene or at least 30% methylstyrene are preferred, particularly when the monomer is to be converted into polystyrene or polymethylstyrene. For this purpose, a styrene fraction or a methylstyrene fraction of at least 50% concentration is particularly preferred.

While the boiling range of extremely dilute styrene fractions may cover a fairly wide range, boiling ranges between approximately 30° to 59° C. at 20 mm. pressure, (125° to 165° C. at 760 mm. pressure) and more especially between approximately 36° and 52° C. at 20 mm. pressure (135° and 155° C. at 760 mm.) are preferred. Narrower fractions such as between approximately 42° and 43° C. at 20 mm. pressure (140° C. and 150° C. at 760 mm.) are particularly desirable. While the boiling range of extremely dilute methylstyrene fractions may also cover a fairly wide range, boiling ranges between approximately 57° to 72° C. at 20 mm. pressure (160° to 180° C. at 760 mm. pressure) and more especially between approximately 60° and 68° C. at 20 mm. pressure (165° and 175° C. at 760 mm. pressure) are preferred. Narrower fractions such as between approximately 61 and 68° C. at 20 mm. pressure (167° C. and 173° C. at 760 mm. pressure) are particularly desirable.

Extremely dilute fractions may be employed in some instances, such as when it is desired to react styrene or methylstyrene with some other compound, in which case my treatment serves to purify such styrene or methylstyrene for reaction purposes.

Certain precautions, however, should be observed, particularly in the case of styrene fractions or methylstyrene fractions containing high concentrations of monomeric styrene or of monomeric methylstyrene. As the styrene or methylstyrene present in fractions containing high concentrations of monomeric styrene or of monomeric methylstyrene may have a pronounced tendency to polymerize in the presence of certain of the amides such as sodium amide, particularly when such materials are in very finely-divided form, certain precautions with respect to reaction temperature and time should be observed with such fractions in order to prevent undue polymerization thereof, as will be more particularly described hereinafter.

The desired quantity of sodium amide or other metallic amide for the removal of undesired impurities from styrene fractions or methylstyrene fractions will vary considerably with the concentration of the fraction and the type and concentration of the impurities present. Thus, in fairly dilute fractions it will be found that from two to five times the theoretical quantity of sodium amide to react with the phenylacetylene or methylphenylacetylene present usually will be sufficient to refine the sample to the desired extent. In the case of very concentrated fractions, however, such as those containing 98–99.9% styrene or methylstyrene, this ratio may be increased to 30 or even 80 times the quantity required to react with the phenylacetylene or the methylphenylacetylene present.

The reaction temperature may vary from very low temperatures, such as −33° C. which is the boiling point of ammonia and lower up to moderately high temperatures, such as 60° C. However, a safe upper limit to preclude excessive polymerization of styrene or of methylstyrene is 50° C., and this is preferably reduced to 30° C. in the case of very concentrated styrene fractions or methylstyrene fractions.

The desired quantity of sodium amide or other active metal amide to be used to refine a given styrene fraction or a given methylstyrene fraction is determined in large measure by the type and quantity of impurities present. In most cases, however, the quantity of phenylacetylene or of methylphenylacetylene found in a given sample may be taken as a measure of the total impurities present. As pointed out previously, the amount of sodium amide to be used may be varied such as from two to eighty times the quantity required to remove the phenylacetylene or the methylphenylacetylene, the exact amount preferably used being dependent largely upon the concentration of styrene or methylstyrene in the fraction.

The method of applying the active metal amide has a considerable influence upon the rapidity with which the impurities are removed. Thus, the use of a dispersion of sodium amide in liquid ammonia such as a solution of sodium amide or suspensions of colloidal sodium amide in liquid ammonia will be found to almost instantaneously remove the impurities from a given styrene fraction or a given methylstyrene fraction due to the molecular dimensions of the individual sodium amide particles and to the intimate contact between the two phases.

The speed of agitation has a very profound bearing upon the rate of removal of impurities from styrene or methylstyrene. In general, it may be said that the rate of removal of such impurities varies directly with the speed of agitation employed.

The time of reaction is an important variable in the removal of impurities from styrene or methylstyrene. As pointed out previously, many of the treating agents described may be good catalysts for the polymerization of monomeric styrene and of monomeric methylstyrene. Consequently, care should be exercised not to exceed certain definite reaction periods in order to prevent any undue loss of styrene or methylstyrene in the form of polystyrene or polymethylstyrene.

Generally speaking, it may be said that the time of reaction may vary from a few seconds to several hours, depending mainly upon the concentration of the styrene fraction or methylstyrene fraction being treated and the reaction temperature. Thus, with very dilute styrene fractions or methylstyrene fractions, say 30–50% concentration, and relatively low reaction temperatures, say 25° C., a reaction time of from three to seven hours normally may be employed without undue loss of styrene or methylstyrene.

With highly concentrated styrene fractions or methylstyrene fractions, say from 98 to 99.9% concentration, and fairly low reaction temperatures, say from 0 to 20° C., reaction times ranging from several seconds to one hour may be employed.

An increase in the reaction temperature employed in the foregoing illustrations is preferably met with a corresponding reduction in the reaction time in order to prevent excessive polymerization.

The following examples will serve to illustrate my invention.

*Example I*

A 0.1 gram portion of metallic sodium was added to a mechanically stirred mixture of 0.03 gram of powdered ferric nitrate (Fe(NO₃)₃6H₂O) in 50 cc. of liquid ammonia in a round bottom flask. Dried air was bubbled through the solution until the blue color was discharged. A 2.5 gram portion of metallic sodium then was added to the reaction mixture in small pieces and the mixture stirred until the blue color was completely discharged.

This solution and suspension of sodium amide in liquid ammonia was added to 300 cc. of a crude styrene fraction at a temperature of −33° C. with good agitation. This crude styrene fraction contained 50.5% styrene and 0.38% by weight of phenylacetylene; it had a color of about 4.2 (Gardner). The mixture was agitated for a period of about 1 hour during which the liquid ammonia present was completely volatilized. The color of the styrene fraction changed from yellow to a deep brown, and a voluminous red precipitate was formed.

The reaction product was distilled, whereupon a clear, sparkling product having a color of less than 0.3 (Gardner) and containing less than 0.01% phenylacetylene was obtained.

*Example II*

A 4.0 gram portion of freshly scraped magnesium ribbon and 2.0 grams of anhydrous sodium iodide were placed in a Pyrex combustion tube.

The tube was then heated under vacuum to 200° C. for 30 minutes to remove traces of moisture.

Ammonia gas, dried by passage through calcium oxide, was passed into the tube and condensed to the liquid state by immersing the tube in a dry ice toluene bath cooled to −40° C. Approximately .01 gram of sodium dissolved in liquid ammonia was added to the contents of the tube and faint blue color was imparted to the liquid ammonia phase. The reacting mixture slowly acquired a deep opaque blue color. The reagents were allowed to react for 16 hours at the end of which time a considerable precipitate of the insoluble magnesium amide was present in the tube. The liquid ammonia phase was still light blue in color at the end of this period. The liquid ammonia was then distilled off.

A 30 cc. portion of the same crude styrene fraction used in Example I was added to the magnesium amide thus prepared and the mixture was subjected to agitation. The crude styrene almost immediately acquired a deep red color and a reddish-brown precipitate was deposited.

The reaction product was distilled, whereupon a product having a color of about 0.3 (Gardner) and containing about 0.12% phenylacetylene was obtained.

In the specification and in the claims the following terms have the following meanings.

The term "a metal of group IA and group IIA of the periodic system" is employed as definitive of the group of metals consisting of lithium, sodium, potassium, rubidium, caesium, magnesium, barium, strontium, and calcium.

The term "alkali metal" is employed as definitive of the group of metals consisting of lithium, sodium, potassium, rubidium and caesium.

The term "alkaline earth metal" is employed as definitive of the group of metals consisting of magnesium, barium, strontium and calcium.

The term "finely divided" is intended to mean a material reduced to such a state of fineness that the preponderating part is composed of particles having no diameter of greater than $\frac{1}{32}''$, as well as materials in the colloidal or dissolved form.

While reagents and procedures of a particular nature have been specifically described, it is to be understood that these are by way of illustration. Therefore, changes, omissions, additions, substitutions, and/or modifications might be made within the scope of the claims without departing from the spirit of the invention.

I claim:

1. A process for purifying an aryl olefine having the styrene structure as a nucleus contained in a mixture which also contains at least one acetylenic compound of similar boiling point and having a hydrogen atom attached to a carbon atom of a triple bond and at least one aldehyde of similar boiling point which comprises commingling with said mixture a finely divided amide of a metal selected from the group consisting of metals of groups IA and IIA of the periodic system under conditions insufficiently drastic to polymerize the preponderant part of said aryl olefine, and separating said aryl olefine in purified form from the resulting mass.

2. A process for purifying an aryl olefine having the styrene structure as a nucleus contained in a mixture which also contains at least one acetylenic compound of similar boiling point and having a hydrogen atom attached to a carbon atom of a triple bond which comprises commingling with said mixture a finely divided amide of an alkali metal under conditions insufficiently drastic to polymerize the preponderant part of said aryl olefine, and separating said aryl olefine in purified form from the resulting mass.

3. A process for purifying an aryl olefine having the styrene structure as a nucleus contained in a mixture which also contains at least one acetylenic compound of similar boiling point and having a hydrogen atom attached to a carbon atom of a triple bond which comprises commingling with said mixture a finely divided amide of an alkaline earth metal under conditions insufficiently drastic to polymerize the preponderant part of said aryl olefine, and separating said aryl olefine in purified form from the resulting mass.

4. A process for purifying an aryl olefine having the styrene structure as a nucleus contained in a mixture which also contains at least one acetylenic compound of similar boiling point and having a hydrogen atom attached to a carbon atom of a triple bond which comprises commingling with said mixture finely divided sodium amide under conditions insufficiently drastic to polymerize the preponderant part of said aryl olefine, and separating said aryl olefine in purified form from the resulting mass.

5. A process for purifying an aryl olefine having the styrene structure as a nucleus contained in a mixture which also contains at least one acetylenic compound of similar boiling point and having a hydrogen atom attached to a carbon atom of a triple bond which comprises commingling with said mixture finely divided potassium amide under conditions insufficiently drastic to polymerize the preponderant part of said aryl olefine, and separating said aryl olefine in purified form from the resulting mass.

6. A process for purifying an aryl olefine having the styrene structure as a nucleus contained in a mixture which also contains at least one acetylenic compound of similar boiling point and having a hydrogen atom attached to a carbon atom of a triple bond which comprises commingling with said mixture finely divided magnesium amide under conditions insufficiently drastic to polymerize the preponderant part of said aryl olefine, and separating said aryl olefine in purified form from the resulting mass.

7. A process for purifying an aryl olefine having the styrene structure as a nucleus contained in a mixture which also contains at least one acetylenic compound of similar boiling point and having a hydrogen atom attached to a carbon atom of a triple bond which comprises commingling said mixture with a dispersion of sodium amide in liquid ammonia under conditions insufficiently drastic to polymerize the preponderant part of said aryl olefine, and separating said aryl olefine in purified form from the resulting mass.

8. A process for purifying styrene contained in a mixture which also contains at least one aldehyde of similar boiling point comprising commingling with said mixture a finely divided amide of a metal selected from the group consisting of metals of groups IA and IIA of the periodic system under conditions insufficiently drastic to polymerize the preponderant part of said styrene, and separating styrene in purified form from the resulting mass.

9. A process for purifying methylstyrene contained in a mixture which also contains at least one aldehyde of similar boiling point comprising commingling with said mixture a finely divided amide of a metal selected from the group consisting of metals of groups IA and IIA of the periodic system under conditions insufficiently drastic to polymerize the preponderant part of said methylstyrene, and separating methylstyrene in purified form from the resulting mass.

10. A process for purifying methylstyrene contained in a mixture which also contains indene comprising commingling with said mixture a finely divided amide of a metal selected from the group consisting of metals of groups IA and IIA of the periodic system under conditions insufficiently drastic to polymerize the preponderant part of said methylstyrene, and separating methylstyrene in purified form from the resulting mass.

11. A process for purifying a light oil styrene fraction containing other material of similar boiling point in addition to styrene and including phenylacetylene which comprises mixing said fraction with a dispersion in liquid ammonia of sodium amide under conditions insufficiently drastic to polymerize the preponderant part of the styrene contained in said light oil fraction, and separating purified styrene from the resulting mass.

12. A process for purifying a light oil methylstyrene fraction containing other material of similar boiling point in addition to methylstyrene including an acetylene which comprises mixing said fraction with a dispersion in liquid ammonia of sodium amide under conditions insufficiently drastc to polymerize the preponderant part of the methylstyrene contained in said light oil fraction, and separating purified methylstyrene from the resulting mass.

CLAUDE W. JORDAN.

REFERENCES CITED

The following references are of record in the file of this patent:

UNITED STATES PATENTS

| Number | Name | Date |
|---|---|---|
| 2,363,676 | Jordan | Nov. 28, 1944 |
| 1,541,176 | Ostromeslensky | June 9, 1925 |
| 1,680,070 | Schroeter | Aug. 7, 1928 |

FOREIGN PATENTS

| Number | Country | Date |
|---|---|---|
| 264,245 | Germany | Sept. 9, 1913 |

OTHER REFERENCES

Richter, "Textbook of Organic Chemistry" (1938), John Wiley & Sons, Inc., New York city, pages 47 and 48. (Copy in Div. 31.)